US005623137A

United States Patent [19]

Powers et al.

[11] Patent Number: 5,623,137
[45] Date of Patent: *Apr. 22, 1997

[54] ILLUMINATION APPARATUS FOR OPTICAL READERS

[75] Inventors: Jeffrey B. Powers, Liverpool; William H. Havens; Thomas W. Karpen, both of Skaneateles, all of N.Y.

[73] Assignee: Welch Allyn, Inc., Skaneateles Falls, N.Y.

[ * ] Notice: The term of this patent shall not extend beyond the expiration date of Pat. No. 5,430,285.

[21] Appl. No.: 413,609

[22] Filed: Mar. 30, 1995

Related U.S. Application Data

[63] Continuation-in-part of Ser. No. 109,735, Aug. 20, 1993, Pat. No. 5,430,285.

[51] Int. Cl.⁶ .................................................. G06K 7/10
[52] U.S. Cl. .......................................... 235/462; 235/472
[58] Field of Search ................................. 235/462, 472, 235/455

[56] References Cited

U.S. PATENT DOCUMENTS

| 4,570,057 | 2/1986 | Chadima, Jr. et al. . | |
|---|---|---|---|
| 4,743,773 | 5/1988 | Katana et al. | 235/472 |
| 4,891,739 | 1/1990 | Yasuda . | |
| 5,233,171 | 8/1993 | Baldwin . | |
| 5,280,161 | 1/1994 | Niwa | 235/472 |
| 5,291,009 | 3/1994 | Roustaei | 235/472 |
| 5,354,977 | 10/1994 | Roustaei | 235/472 |
| 5,449,892 | 9/1995 | Yamada | 235/462 |
| 5,468,950 | 11/1995 | Hanson | 235/472 |

FOREIGN PATENT DOCUMENTS

| 2673738 | 3/1991 | France . | |
|---|---|---|---|
| 2700404 | 1/1993 | France . | |
| 59-35276 | 2/1984 | Japan | 235/462 |
| 63-56768 | 3/1988 | Japan | 235/462 |
| 4349585 | 12/1992 | Japan | 235/462 |
| 5189592 | 7/1993 | Japan | 235/462 |

Primary Examiner—Donald T. Hajec
Assistant Examiner—Mark Tremblay
Attorney, Agent, or Firm—Harris Beach & Wilcox, LLP

[57] ABSTRACT

An apparatus for illuminating an indicia in a sensing region of an object plane. A housing has a median longitudinal vertical plane and a horizontal scanning plane. A reflector for reflecting light directed thereagainst toward the sensing region has a first approximately curvilinear profile in a plane parallel to the scanning plane, and a second approximately curvilinear profile in a plane parallel to the median longitudinal plane. The central portion of the reflector defines an opening whereby light from the sensing may return in generally the same plane as light directed toward the sensing region.

33 Claims, 10 Drawing Sheets

$y = \cos \beta$

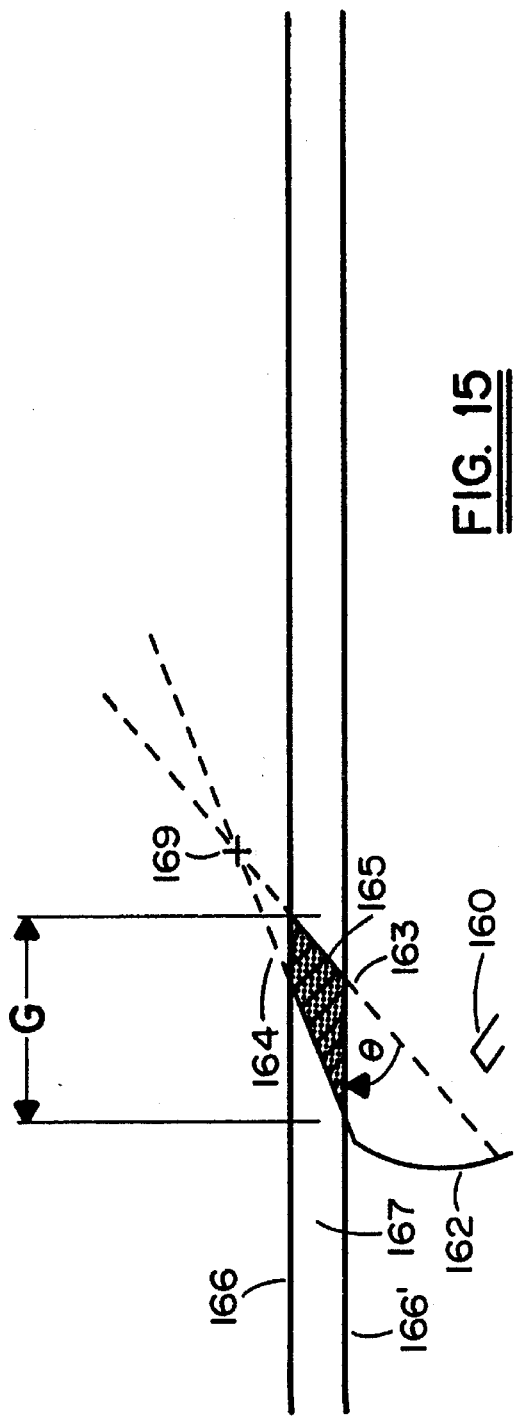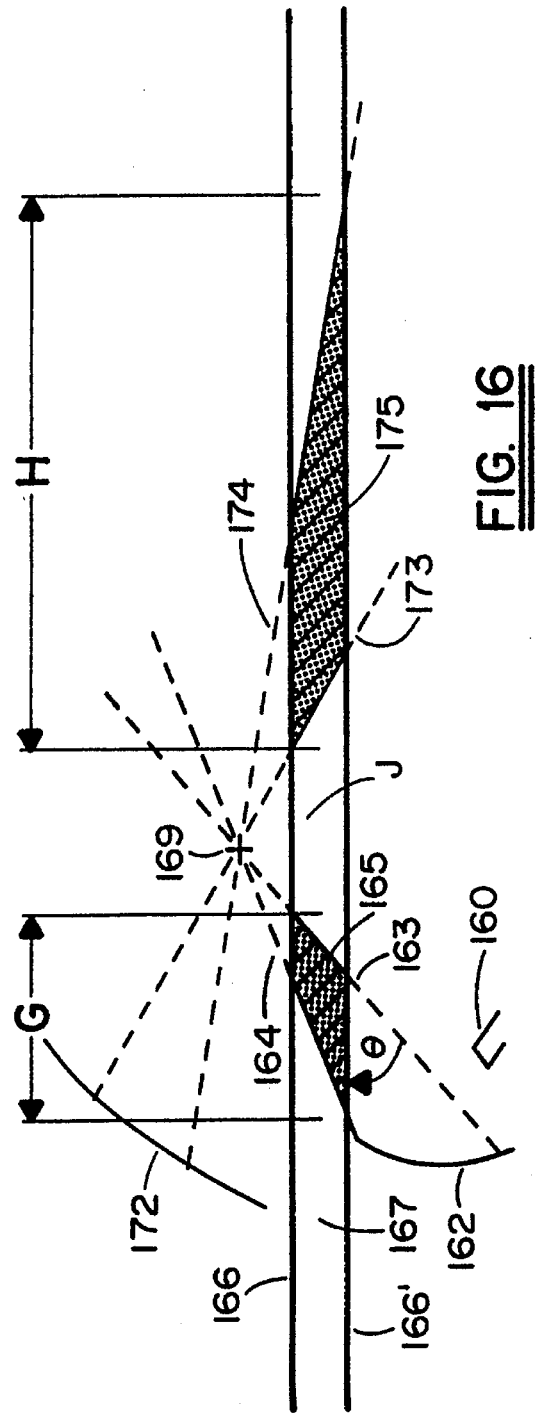

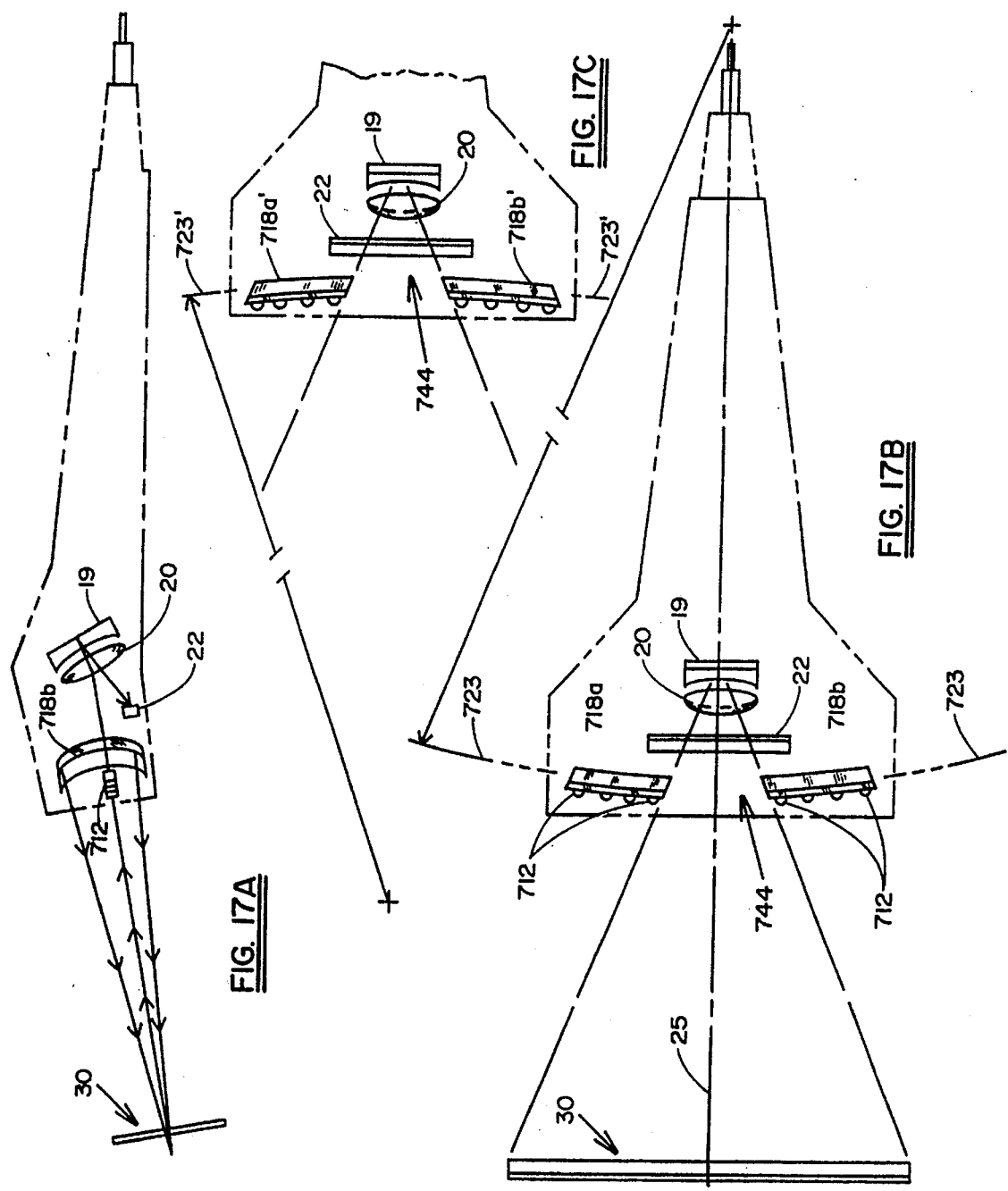

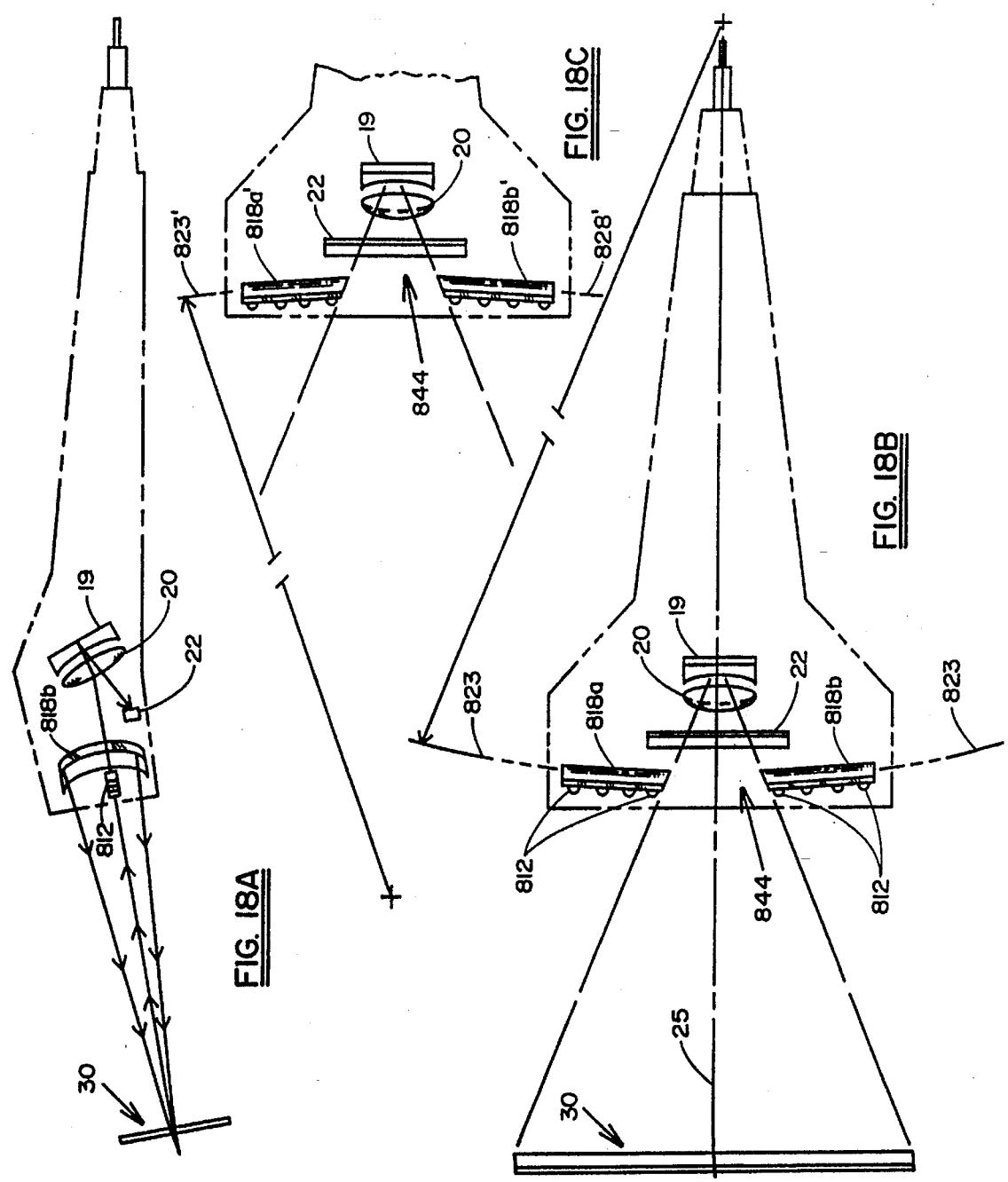

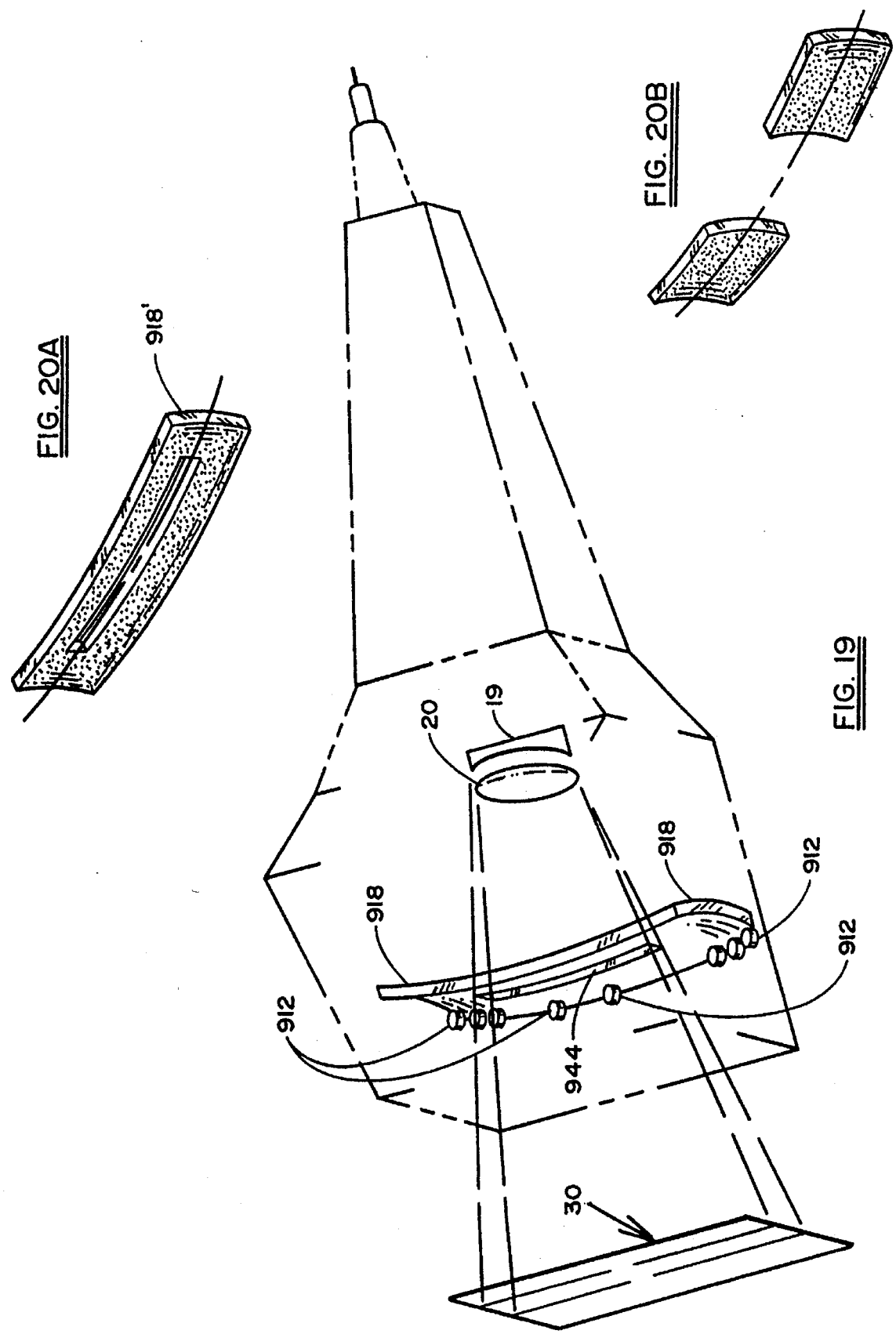

ically to a position between the lenses and the reflector. This arrangement allows the scanner to be made more compact than would otherwise be possible.

ILLUMINATION APPARATUS FOR OPTICAL READERS

CROSS-REFERENCES TO RELATED APPLICATIONS

This is a continuation-in-part of U.S. Patent application Ser. No. 08/109,735, filed Aug. 20, 1993, now U.S. Pat. No. 5,430,285 entitled CURVED ELLIPTICAL REFLECTOR.

BACKGROUND OF THE INVENTION

1. Field of the Invention

This invention relates to illumination systems for optical readers such as bar code scanners. More particularly, this invention relates to an improved light transmitting and receiving apparatus for use in optical readers.

2. Description of the Prior Art

Modern optical reading devices such as bar code scanners are required to read relatively wide bar code symbols while remaining in a stationary position at the instant of reading. It is also desirable that the system optics provide a large depth of field in order to read curved surfaces, or surfaces otherwise having uncertain displacement from the reading device, and to generally provide increased ease of reading. At the same time there is a need to conserve power, a goal which is limited by the requirements of the optics, the sensitivity of the photodetector, and the minimal acceptable signal-to-noise ratio.

In U.S. Pat. No. 4,766,300 (Chadima), there is disclosed a portable bar code reader which employs an elliptical reflector that is elongated in a width dimension of the bar code reader so as to illuminate a region located in front of an optical window and containing a bar code symbol. In this device, light rays diverge from a flash tube illumination source toward a surface to be scanned, and are reflected in a receive path that passes above and beyond the reflector in a generally rearward direction. This arrangement results in a relatively large angle between the illumination path and the receive path. Also, across the scan width there is significant off-axis falloff of illumination intensity, which limits the ability to read indicia that are situated at the ends of a wide sensing region.

In U.S. Pat. No. 4,891,739 (Yasuda), an optical arrangement is shown for uniformly illuminating a planar surface using a curved reflecting mirror by a non-Lambertian arcuate or point light source. A light shielding member is required to prevent light from the source from directly reaching the object to be illuminated.

In U.S. Pat. No. 5,233,171 (Baldwin) there is disclosed an optical code reader of the stationary type in which LED light sources are connected together and used as paired elements.

In French Patent Publication No. 2,700,404 (Massieu), there is disclosed a bar code illumination system which illuminates a bar code symbol via a plurality of lens segments and receives image data through an opening between the lens segments.

In Japanese patent abstract 63-56768 (Nishijima), there is shown a bar code scanner which illuminates a bar code symbol via a reflector that includes a centrally disposed opening through which image data is received.

SUMMARY OF THE INVENTION

It is an object of the present invention to provide an improved system for illuminating a two dimensional object.

It is another object of the invention to provide an improved illumination system that illuminates a field of view that is wider than the optical window of the scanner and operates with low off-axis falloff.

It is still another object of the invention to provide an illumination apparatus in which the path along which light is transmitted toward the object to be read and the path along which light returns from the object to be read lie in substantially the same plane.

In a first embodiment, the apparatus generally comprises a housing having a median longitudinal plane and a scanning axis lying in a horizontal scanning plane perpendicular to the median longitudinal plane, a reflector mounted within the housing for reflecting light directed thereagainst toward the sensing region, said reflector having a first approximately curvilinear profile in a plane parallel to said scanning plane and a second approximately curvilinear profile in a plane parallel to said median longitudinal plane, said reflector being elongated generally along said scanning axis and having a central portion, two end portions and a focal line connecting a plurality of focal points, the central portion of said reflector defining an opening for the passage of light from said sensing region through said reflector, and a plurality of sources of substantially Lambertian illumination disposed in said focal line for directing light against the reflector.

In this embodiment, the reflector may comprise a single-piece reflecting member and the opening may be confined to the central portion of the reflector. The fact that this opening need not extend into the end regions of the reflector allows the reflection of more light from these end regions, thereby improving the off-axis performance of the apparatus. The off-axis performance of the apparatus may also be improved by locating more light sources adjacent to the end portions of the reflector than are located adjacent to the central portion thereof, i.e., increasing the density of light source distribution as a function of distance from the median longitudinal plane of the apparatus. In the extreme case, the central portion of the reflector may be altogether devoid of light sources.

A second embodiment of the invention is generally similar to the first embodiment, except that it includes a reflector made up of a plurality of discrete reflectors (or reflector segments) which are not connected to one another, but which cooperate as if they were parts of a single piece reflector. Ordinarily, the apparatus will include two such reflector segments which are disposed on opposite sides of the median longitudinal plane of the apparatus or on opposite sides of the scanning plane thereof. In this embodiment of the invention the gap or open space between the separate reflector segments serves the function of the opening in the central region of the reflector of the first embodiment, namely: to allow light received from the sensing region to be transmitted along generally the same path along which the reflector transmits light toward the sensing region. The separate reflector segments also tend to produce an improvement in the off-axis performance of the apparatus similar to that described in connection with the end regions of the first embodiment.

In both embodiments of the invention, light received from the sensing region is focused on a photodetector array by a focusing system that may include suitable focusing lenses or mirrors or some combination thereof. With such focusing systems, an auxiliary mirror may be provided between the lenses and the detector to cause light in the optical receive path to be redirected or even folded back on itself, i.e., directed back in the general direction of the sensing region. Such folding back is desirable because it allows the physical length of the apparatus to be reduced.

In the event that the conditions of illumination are known to be favorable, it may be unnecessary to use reflectors having truly elliptical or parabolic profiles. In such cases the benefits of the present invention may be approximated by using simpler profiles which are curvilinear or which include a plurality of straight profile segments which together approximate a curvilinear profile. Such approximations to curvilinearity may naturally be provided for profiles that lie in one or both of the median longitudinal or scanning planes.

The present invention may also be practiced with light diffusing elements disposed in the outgoing optical path between the light sources and the sensing region. Such diffusing elements are beneficial because they substantially remove from light illuminating the sensing region, image information about the light sources that produce that light. This, in turn, reduces potentially troublesome source image effects. Such diffusing elements may be of either the transmissive or the reflective varieties.

BRIEF DESCRIPTION OF THE DRAWINGS

For a better understanding of these and other objects of the present invention, reference is made to the detailed description of the invention which is to be read in conjunction with the following drawings, wherein:

FIGS. 15 and 16 are diagrams indicating certain performance characteristics of optical assemblies in accordance with alternate embodiments of the invention;

FIGS. 17A through 17C are diagrammatic sectional side and top views of alternative embodiments of the invention;

FIGS. 18A through 18C are diagrammatic sectional side and top views of further alternative embodiments of the invention;

FIG. 19 is an oblique diagrammatic view of a still further alternative embodiment of the invention; and FIG. 20A and 20B show reflectors having reflective surfaces which have a surface texture that enables them to diffuse light incident thereon.

DESCRIPTION OF THE PREFERRED EMBODIMENT

Figure 1:
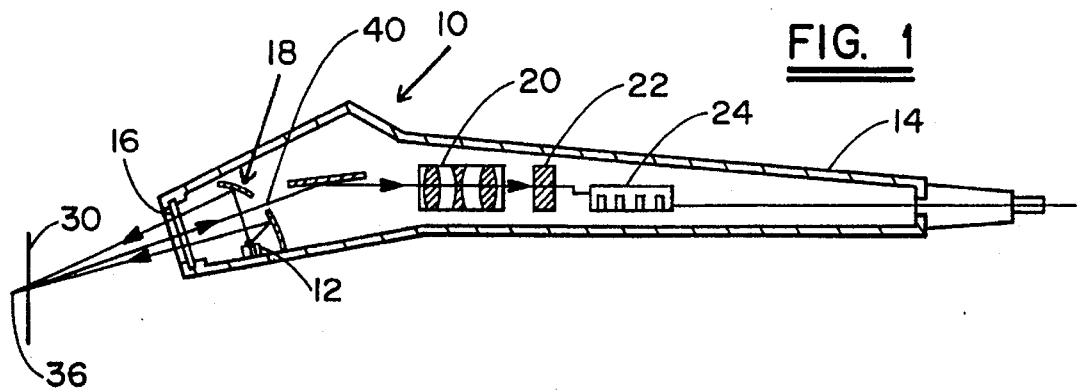
FIG. 1 is a simplified sectional view taken through a median longitudinal plane of a bar code scanner incorporating an optical arrangement in accordance with the invention.

In the drawings wherever circuits require a power source, it is assumed for the purpose of simplifying the diagrams that an appropriate source of electrical power is provided.

First embodiment:

In FIG. 1 there is shown a side view of an embodiment of the invention in conjunction with a bar code reader 10, which could be hand-held, or machine mounted as desired for a particular application. A housing 14 contains other functional components of the reader. A substantially Lambertian light source 12, preferably a plurality of light emitting diodes (LEDs), is disposed in a frontal portion of the housing. While the LEDs are not ideal Lambertian sources due to the reflector found within the LED packaging, they have substantially Lambertian characteristics. The LEDs emit light toward a reflector 18, which reflects light incident thereon through a window 16 in the nose of the housing. As the Lambertian sources project light into a $2\pi$ steradian solid angle, that is all the light energy radiates into the forward directed hemisphere, it is not required to provide a light shielding member to prevent the light from shining directly on the target and producing an undesired pattern of illumination. It is advantageous that the LEDs are quasi-monochromatic. They should be configured to radiate in the region of the spectrum appropriate to the application. In bar code reading applications, 660 nm LEDs are suitable. The use of band pass filters is thus avoided. It has been found that providing a plurality of LEDs as a light source has an important economic advantage as well. They can be flexibly disposed and therefore can readily be arranged to conform to a variety of reflector radii with low incremental manufacturing costs. Furthermore they are durable, efficient, and operate with low power drain as compared with xenon lamps as taught in the prior art. The ability to operate under low power drain is due in part to the intrinsic conversion efficiency of the LEDs, and in part to their monochromaticity which allow for maximum transfer of light from the source to the target without losses through radiation outside the desired region of the spectrum.

Figure 11:
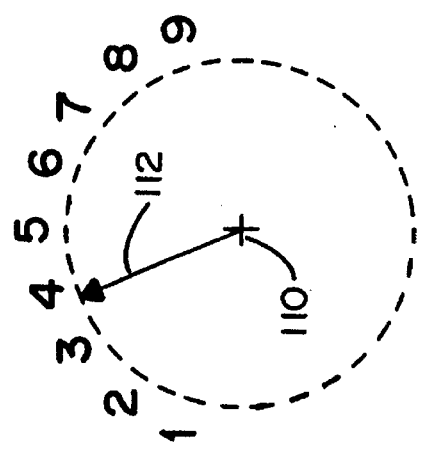

The difference between the illuminating characteristics of a uniformly emitting light source as known from the above-noted Yasuda patent, for example, and the Lambertian sources in accordance with the invention can be appreciated with reference to FIGS. 11–14. In FIG. 11 a uniformly emitting point source 110 emits light whose intensity is sampled by a suitable detector at positions 1–9, all equidistant from the source 110. In FIG. 11 an light ray directed toward position 4 is indicated by arrow 112. The results of the irradiance measurements are plotted in FIG. 12, wherein the readings are constant for all sampled positions.

Figure 13:
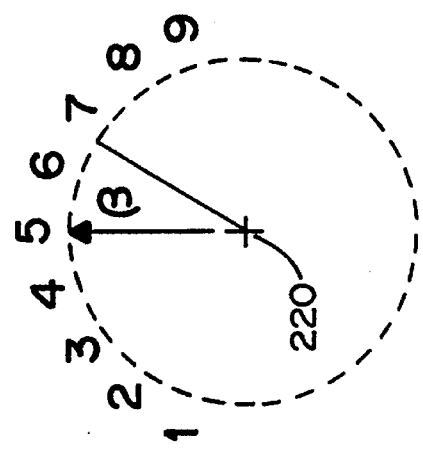

In FIG. 13 a Lambertian source 220 is directed at position 5, and irradiance measurements taken are taken by a detector equidistantly positioned at various viewing angles $\beta$ from position 5 at positions 1–9, an exemplary angle $\beta$ being shown in FIG. 13. The results of these measurements are plotted in FIG. 14, wherein the readings vary as the cosine of $\beta$. Although not shown in the plot, readings taken at angles beyond positions 1 and 9 would be zero.

The window 16 transmits light from the reflector to illuminate an external sensing region 30 that contains indicia on a surface or substrate, such as a bar code symbol. Region 30 is shown as a volume having a line 31 of best image. Window 16 also admits light-scattered or reflected from the sensing region 30 which carries an optical pattern of the indicia in the sensing region 30 into the interior of the housing 14. The admitted light continues through receive optics 20 which project an image of the indicia onto a photodetector 22, preferably a CCD array. An auxiliary mirror or reflector 19 may be included to conform the optical path to the shape of housing 14. The photodetector 22 generates a signal responsive to the luminous intensity of the light incident thereon. This signal is coupled to suitable electronics 24 for further signal processing, for example amplification, analog-to-digital conversion, and digitization. Electronics 24 may include a decoder and a microprocessor for interpreting information in the signal received from the photodetector. The housing 14, mirror 19, optics 20, photodetector 22, and the electronics 24 are well known in the art. As they do not form a part of the invention, they will not be further discussed herein. The purpose of the housing 14 is to provide mechanical support for the other functional components, and to shield the photodetector from light other than the admitted light from the sensing region 30. The invention can equally be practiced in embodiments wherein one or more of the optics 20, electronics 24, light source 12, and the reflector 18 are disposed outside the housing 14.

Figure 7:
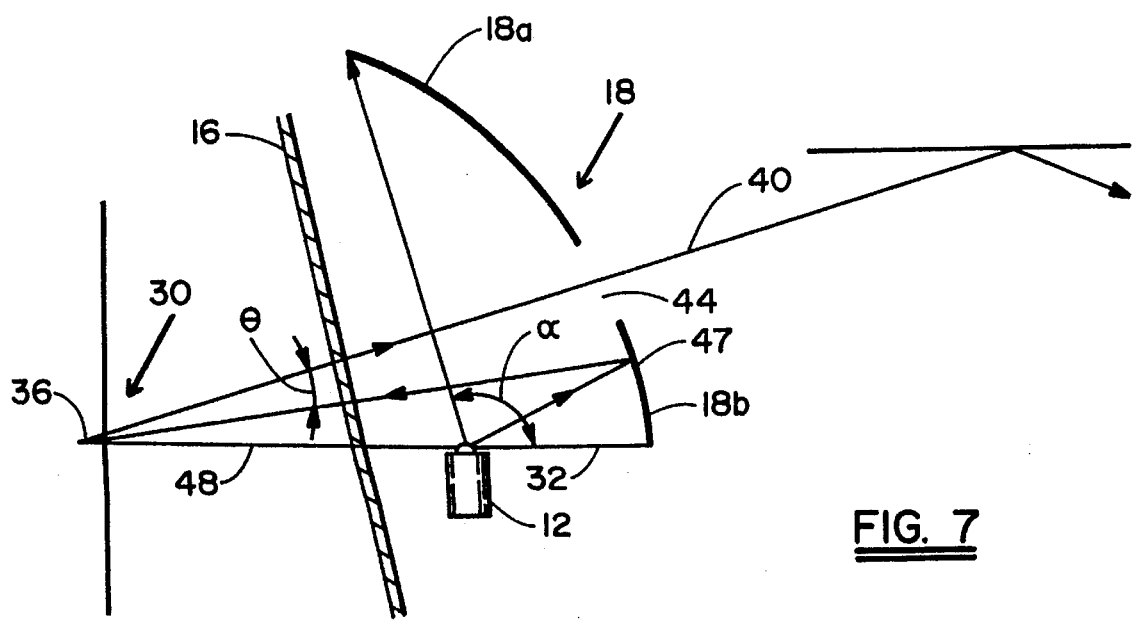
FIG. 7 is another diagram of a reflector which is helpful in understanding the invention.

As best seen in FIG. 1, reflector 18 has a curved reflecting profile in the plane shown, which is preferably an ellipse. Light source 12 is disposed substantially at a primary focal point thereof, and has its luminous surface directed toward the reflector 18. With reference to FIG. 7, it is desirable that the collection angle α, subtended by extreme light rays 32, 34 extending from the light source 12 to the reflector 18, be at least 120°. Light is also collected by the reflector 18 in planes other than that shown in FIG. 1 and is generally directed toward the sensing region. Reflector 18 directs the light from light source 12 onto a substrate within sensing region 30, disposed generally at a secondary focal point 36 from which some of it returns toward the window 16 along a receive light path 40, passing through a gap 44 in the reflector 18 toward the optics 20. It is convenient to explain the advantages of the gap 44 with reference to an angle θ defined by the intersection of light path 40 with the major axis of the ellipse, indicated by light ray 32 and its leftward continuation as line 48 (also shown in FIGS. 15–16). In the known prior art devices, receive path 40 passes above the reflector 18, so that θ is relatively large. Providing gap 44 in the reflector 18 allows a smaller angle θ). This has the important advantage of increasing the overlap (shown as shaded areas 165, 175 in FIGS. 15 and 16) between the field of illumination and field of view of the photodetector 22 (the region of sensitivity) and thereby increasing the signal strength reaching the photodetector. The signal-to-noise ratio and the rate of valid first reads is thus improved.

Figure 6:
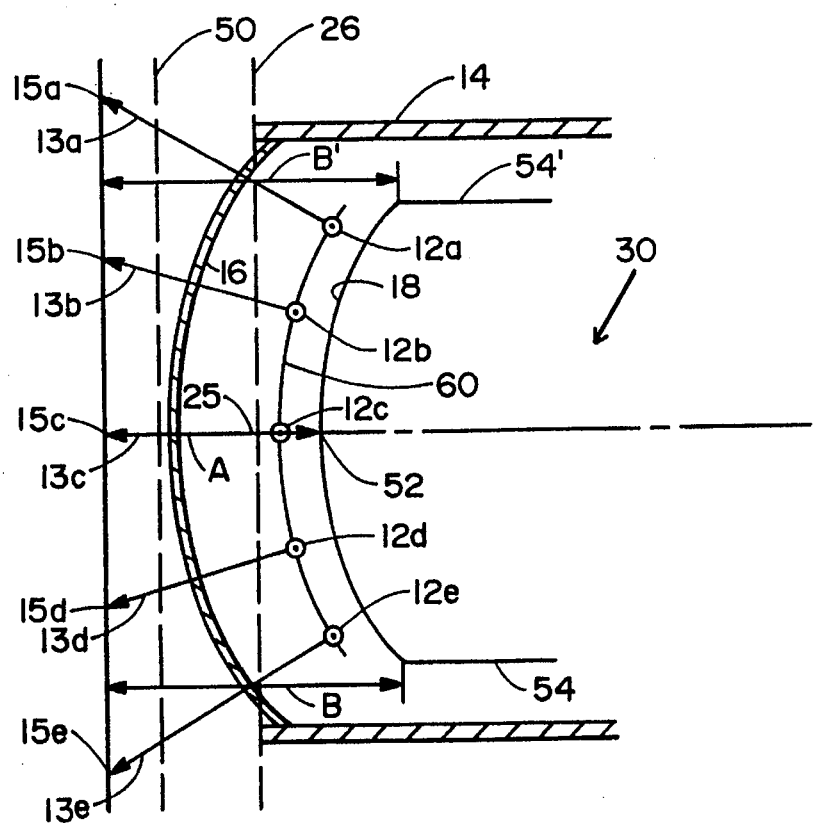
FIG. 6 is a detailed sectional diagrammatic view of the reflector show in FIGS. 3 and 4.

Turning now to FIGS. 6 and 7, the frontal portion of the scanner is shown in greater detail. A median longitudinal plane 25 and a cross-longitudinal plane 26 are indicated for reference. A frontal plane 50 parallel to cross-longitudinal plane 26 is shown at the intersection of window 16 and plane 25. The window 16 is not necessarily coplanar with plane 50, but can be realized as an angulated or curved sheet of transparent material. However window 16 can equally be a non-curved surface, or can even be an open port. Reflector 18 is elongated along a curve or arc 23 that extends generally across the width of the housing, corresponding to the scanning or reading direction, and has a central portion 52 and end portions 54, 54'. Arc 23 lies in a plane that is generally perpendicular to both planes 25 and 26 and extends generally horizontally across the width of the housing as shown in FIG. 6. This plane will be referred to hereinafter as the horizontal scanning plane or plane of elongation and contains the read light path 40 of the scanner. The surface of reflector 18 is preferably not linear in intersections with planes parallel to the scanning plane. Instead the latter intersection defines an approximately curvilinear profile in such planes. Stated differently, reflector 18 is curved backward, such that the displacement A of central portion 52 from the frontal plane 50 is less than either of the displacements B, B, of the end portions 54, 54' therefrom. In the preferred embodiment the curvature of the profile of the reflector in planes parallel to the scanning plane is a circle. The curvature can be adjusted in accordance with the requirements of a given application. Also the curvature need not be circular, but can be any curved shape, or even a series of angulated straight lines.

Similarly, the surface of reflector 18 is preferably not linear in intersections with planes parallel to the median longitudinal plane. Instead the latter intersection defines an approximately curvilinear profile in such planes. Stated differently, the upper and lower ends of reflector 18 are curved forwardly with respect to the center thereof. In the preferred embodiment, the curvature of the profile of the reflector in planes parallel to the median longitudinal plane is an ellipse, but can be any curved shape or even a series of angulated straight lines. Viewed as a whole, the reflecting surface thus has a saddle-like configuration.

Light source 12 is realized as a plurality of LEDs 12a–12e each disposed at a primary focus of an elliptical profile of reflector 18. A focal line 60 connecting LEDs 12a–12e preferably parallels the backward horizontal curvature of the reflecting surface. It is possible to adjust the parameters of the ellipse, however, so that line 60 does not parallel the reflecting surface, but has another configuration in order that the secondary foci of reflector 18 conforms to the geometry of a particular sensing region. The purpose of the backward horizontal curvature is to direct reflected light laterally in order to achieve a divergent illumination of a sensing region that is wider than window 16 without substantial off-angle image irradiance falloff. There should be sufficient horizontal curvature to assure a degree of divergence of the illumination that exceeds the intrinsic divergence of the LED itself.

Considering now a particular LED 12e which faces end portion 54 of reflector 18, and again with reference to FIG. 1, light originating from the LED 12e and striking the reflecting surface of reflector 18 is primarily redirected in the sectional plane of the elliptical profile through the window 16 as ray 13e. Ray 13e diverges at a substantial angle with the median longitudinal plane 25 to strike a point 15e located near the extreme lateral end of sensing region 30. In like manner LED 12c, disposed opposite central portion 52 of reflector 18 casts a light ray 13c which strikes point 15c, near the central portion of sensing region 30. Sensing region 30 is preferably displaced from the secondary focus 36 to achieve a broader dispersal of light on the sensing region. Reflector 18 is constructed by well known techniques, such as plastic injection molding. Vacuum electro-deposition of aluminum plating is suitable for providing the reflecting surface. The structure of the reflector is provided with conventional adaptations (not shown) for mounting in the housing 14. By way of nonexclusive examples, these could be brackets, apertures for screws, bolts or rivets, weldments or adhesives as appropriate for the working environment of the device. The LEDs 12a–12e can be mounted on a suitably configured circuit board having suitable pins or similar provisions for electrical power.

The following table indicates dimensions which work well in a prototype device in accordance with the above embodiment for reading bar code symbols exceeding 50 mm in length. In the table all dimensions are in inches, and are measured with respect to the reflecting surface.

TABLE 1

| Semi-major Axis | 2.500 |
|---|---|
| Semi-minor Axis | 0.500 |
| Radius of horizontal curvature | 10.000 |

Figure 4:
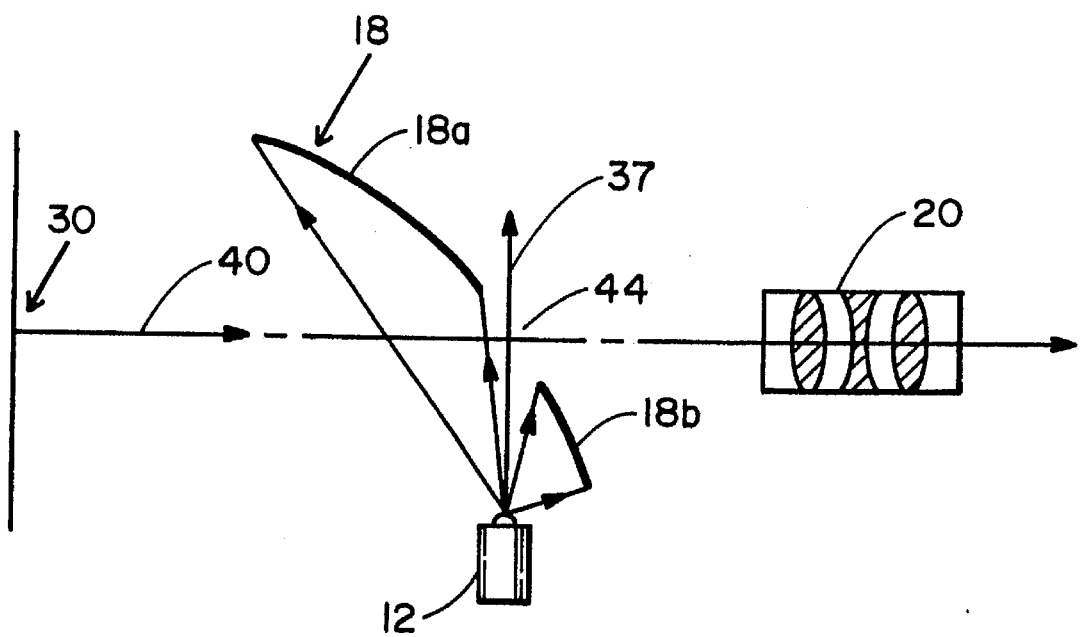
FIGS. 4 and 5 are diagrammatic sectional views indicating two alternate embodiments of a reflector in accordance with the invention.

In FIG. 4 a reflector 18 is shown in greater detail, and is divided into an upper portion 18a and a lower portion 18b, the two separated by gap 44. Portions 18a and 18b may be continuations of the same elliptical profile. Light originating from one focus of an ellipse converges at the other focus. However either or both portions 18a, 18b can be parabolic, in which case the light source 12 is disposed at the focus or foci thereof. A parabolic reflector having a light source at its focus will of course direct parallel beams of light toward the sensing region, and produce a relatively uniform light distribution thereon. The distribution will not be entirely uniform, as the light source 12 is not an ideal point, but has finite spatial dimensions.

The advantages of the gap 44 can be appreciated with reference to FIGS. 15 and 16. In FIG. 15 a source 160 is positioned at the near focal point of an elliptical reflector 162 and shines thereon. A reflected light beam, indicated by marginal rays 163, 164 converges to a secondary focal point 169 disposed on the major axis of the ellipse. A receive path 167 is defined by parallel lines 166, 166', which extends to a photodetector (not shown). An object positioned in the shaded region 165 will be illuminated and cast reflected light along the receive path. This arrangement provides a functional depth of field indicated by dimension G. FIG. 16 shows the same arrangement as FIG. 15, except now reflector 169 is augmented by a second elliptical reflector 172, which is displaced upward a distance corresponding to the width of receive path 167 and has its near focal point at light source 160. Light originating from the source 160 reflects from reflector 172 and defines a beam indicated by marginal rays 173, 174, which converges substantially at point 169 and then passes through the receive path 167 to define a region 175. In this arrangement objects located in region 165 and region 175 will be illuminated by light reflecting from reflector 162 and reflector 172, respectively, and will retroreflect light along the receive path 167. It is apparent that the functional depth of field represented in FIG. 16 by dimension G is now discontinuously augmented by the width dimension H of region 175. In FIGS. 15 and 16 the source 160 is an ideal point source; however in practice it has finite dimensions that increase the size of shaded regions 165, 175 and tend to eliminate the intermediate zone J therebetween.

Figure 5:
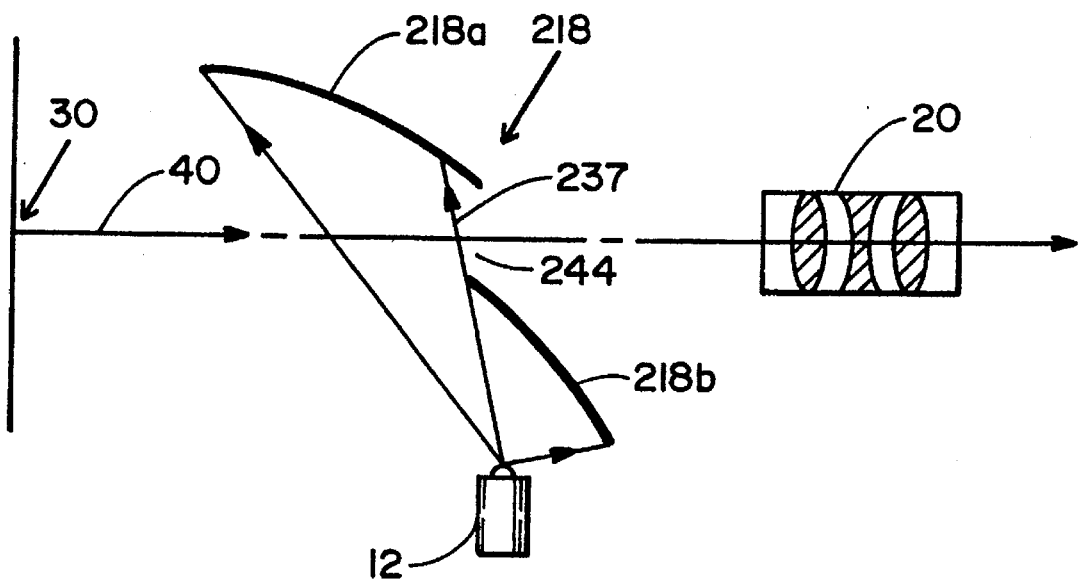

Second embodiment:

In FIG. 5 there is shown a second embodiment of the reflector, in which elements differing from the embodiment of FIG. 4 have reference numerals advanced by 200. In FIG. 4 an exemplary light ray 37 passes from light source 12 through the gap 44 and fails to be reflected toward the sensing region. The light energy carried by light ray 37 thus does not contribute to the illumination of the sensing region 30, and reduces the global efficiency of the arrangement. In FIG. 5 The gap 244 is occulted by the lower portion 218b of the reflector 218, so that no light energy is lost therethrough. In this embodiment portions 218a and 218b may also be ellipses or parabolas in any combination. It is necessary that the equations describing curved surfaces 218a and 218b differ in order to assure that light source 12 remains at the foci or primary foci of the respective ellipses and parabolas as the case may appear.

Figure 2:
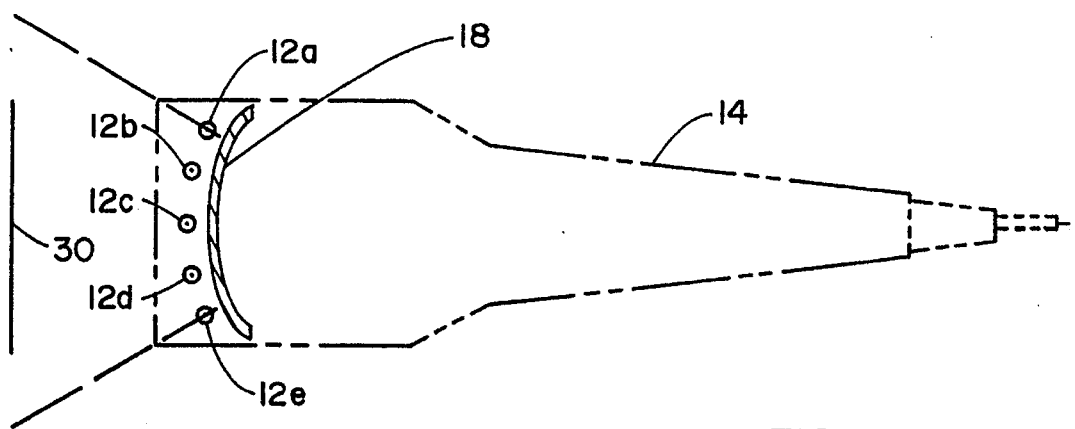
FIG. 2 is a sectional view of the device shown in FIG. 1 taken through a scanning plane orthogonal to the plane of FIG. 1.
Figure 9:
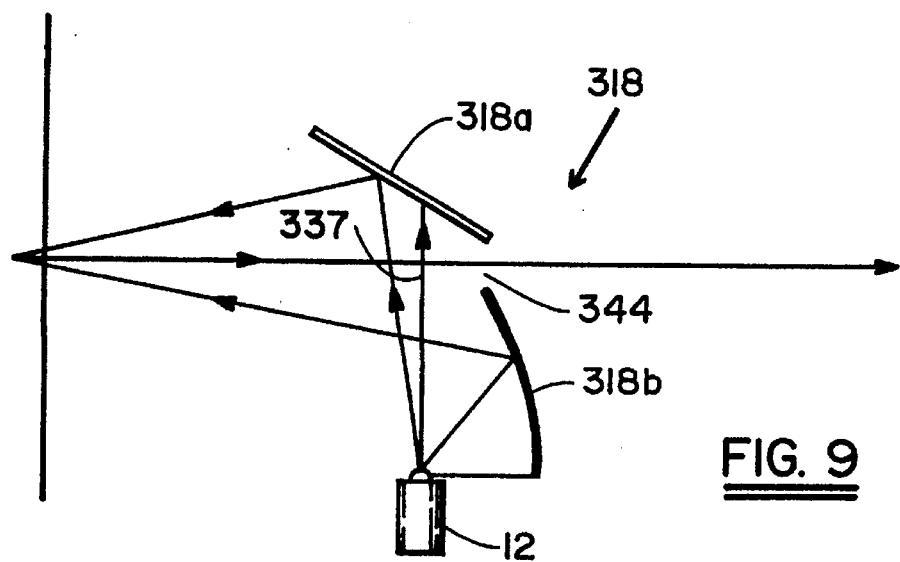
FIGS. 9 and 10 are diagrammatic sectional views of alternate embodiments of a reflector.

Third embodiment:

In FIG. 9 there is shown a third embodiment of the invention, wherein elements differing from those in FIG. 4 have reference numerals advanced by 300. This embodiment is similar to the embodiment of FIG. 5, except that now the top portion 318a of reflector 318 is a flat surface in profile, while lower portion 318b can be elliptical or parabolic. As discussed in the first embodiment herein, the reflector 318 is curved or angulated in planes parallel to the scanning horizontal plane as shown in FIGS. 2 and 3.

Figure 3:
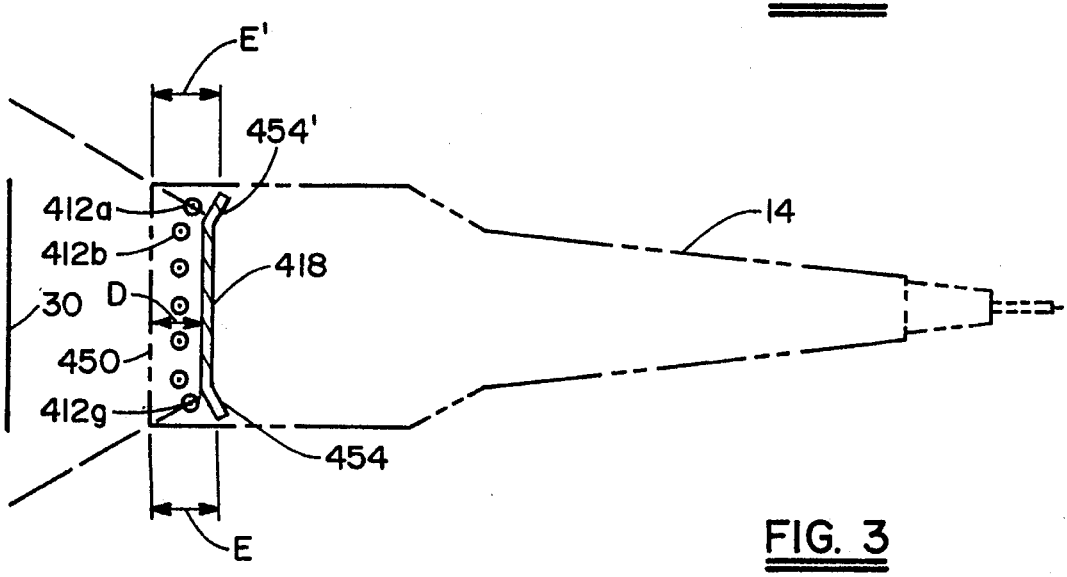
FIG. 3 is a top plan view of an alternate embodiment of the invention.

Fourth embodiment:

Turning now to FIG. 3, there is illustrated a fourth embodiment of the invention, wherein a reflector 418 has a linear central portion 452 and two angulated end portions 454, 454'. LEDs 412a and 412g throw light onto end portions 454' and 454 respectively for reflection toward off axis end portions of the sensing region 30. In like manner LEDs 412c, 412d and 412e face the central portion 452 and contribute primarily to illuminating the central portion of the sensing region 30. In this embodiment the central portion 452 and frontal plane 450 are separated by a dimension D, while dimensions E, E' separate end portions 454, 454' from the frontal plane 450 respectively. Dimension D must be less than either of the dimensions E, E'.

Figure 8:
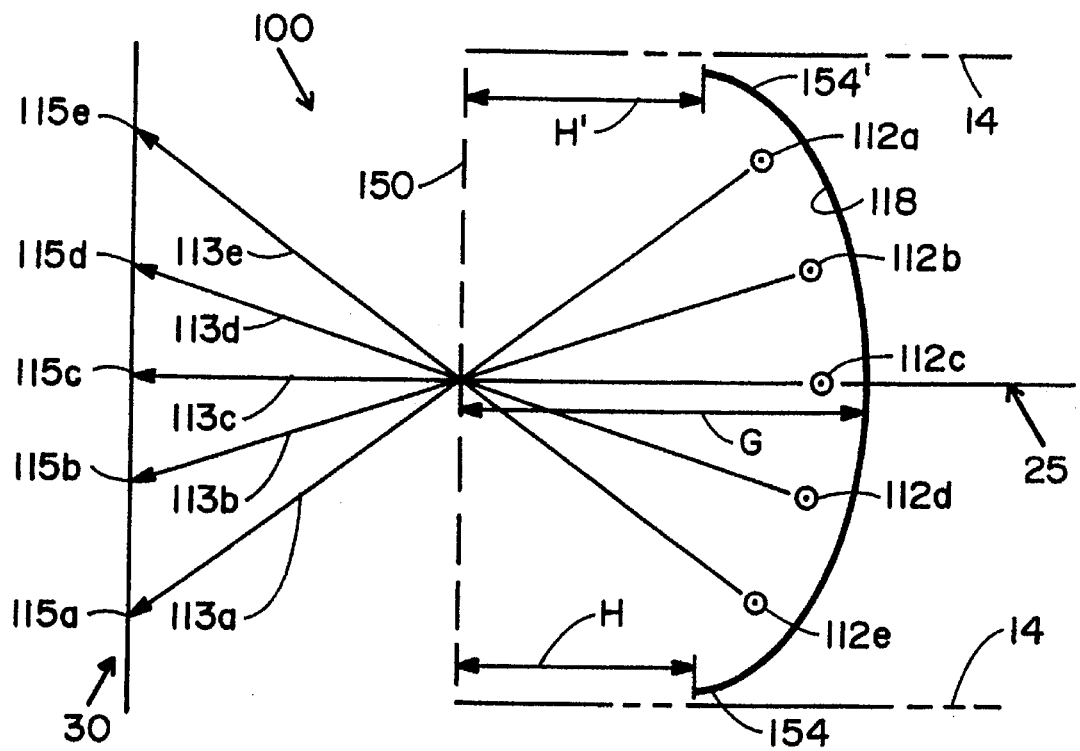
FIG. 8 is a diagram of yet another embodiment of the invention taken in the same plane as the reflector shown in FIG. 6.

Fifth embodiment:

In FIG. 8, a fifth embodiment of the invention is shown. A reflector 118 in profile can have any of the configurations described previously, but it has a reversed horizontal curvature. Reflector 118 has a central portion 152 separated from frontal plane 150 by a dimension G, and end portions 154, 154' respectively separated from frontal plane 150 by dimensions H, H'. In this embodiment dimension G exceeds either dimension H, H'. LEDs 112a–112e are distributed facing the reflecting surface of reflector 118, and produce light rays 113a–113e, which fall on sensing region 30 at points 115a–115e respectively. For a particular LED, which is offset from the median longitudinal plane 25, such as LED 112a, incident point 115a lies on the opposite side of the plane 25. If the sensing region 30 is itself linear, as shown in FIG. 8, the equations of the elliptical profiles in the planes of the light rays 113a, 113b may vary accordingly, so that the secondary foci are flat field compensated. This embodiment can be constructed in a narrow, relatively tall housing 14, and may be advantageous in certain applications where the dimensions of the bar code reader are restricted, and to enable the operator to visualize the lateral portions of the sensing region 30 during a reading operation.

Figure 10:
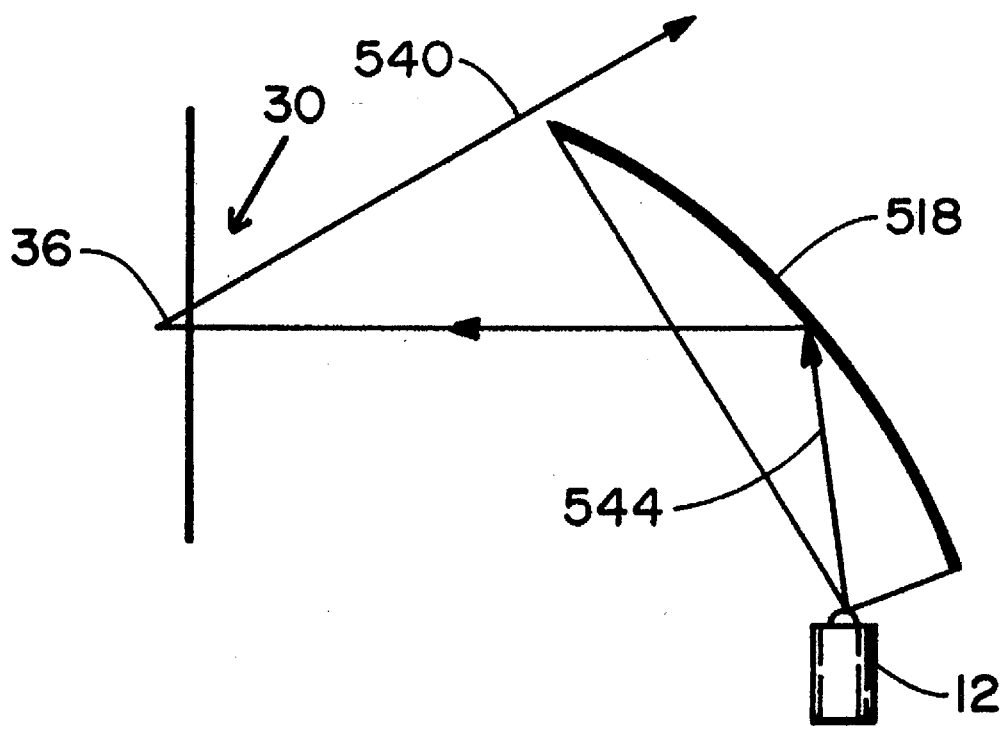
Figure 12:
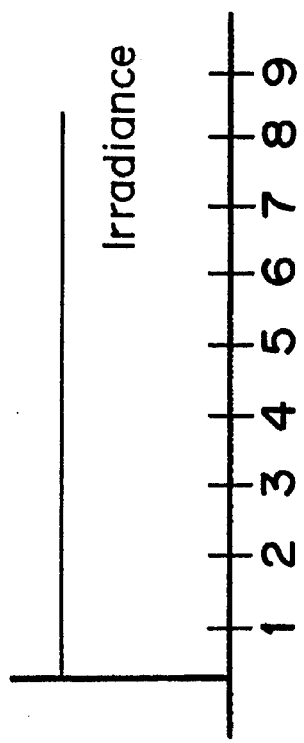
FIGS. 11 and 12 are diagrams indicating the radiance of a point source in accordance with the prior art.
Figure 14:
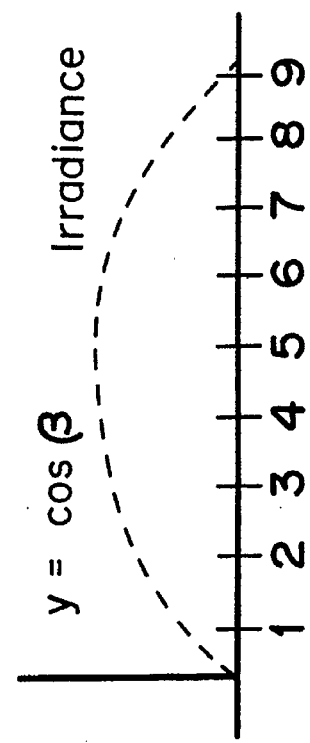
FIGS. 13 and 14 are diagrams indicating the radiance of a Lambertian source.

Sixth embodiment:

A sixth embodiment of the invention is illustrated in FIG. 10. This is generally similar to the embodiment of FIG. 4, except that the reflector 518 lacks gap 44. The receive light path 40 clears the top surface of the reflector. This embodiment has the advantage of simplified construction to avoid light loss, but lacks the advantages of the gap, discussed above.

Seventh embodiment:

Referring to FIGS. 17A and 17B, there are shown respective side and top diagrammatic sectional views of still another embodiment of the invention. The embodiment of FIGS. 17A and 17B is generally similar to that of FIG. 4, except that, in the embodiment of FIG. 17, the reflector is divided into two separate or discrete reflector portions 718a and 718b which are separated by a gap 744 that extends horizontally along arc 723 of the scanning plane, i.e., to the right and left of median longitudinal plane 25. In FIG. 4, by contrast, the reflector is divided into two discrete reflector portions 18a and 18b which are separated by a gap 44 that extends vertically above and below the scanning plane.

In both embodiments, however, the reflective surfaces of the reflectors have saddle-like curvatures as a result of their having curved profiles in planes parallel to both the median longitudinal and scanning planes. In addition, in both embodiments, the sensing region, the gap between the reflector portions and the focusing optics lie in generally the same plane, i.e., the horizontal or scanning plane. Thus, the embodiments of FIGS. 4 and 17A–17B are conceptually and operationally similar to one another.

Referring to fragmentary FIG. 17C, there is shown an embodiment of the invention which is similar to that of FIGS. 17A–17B, except for the use of reflector portions which have a reversed horizontal curvature along arc 723. More particularly, the reflector portions shown in FIG. 17C have curvatures which are parallel to that of an arc 723' which curves toward the sensing region rather than to an arc 723 which curves away from the sensing region. Thus, the embodiments of FIG. 17C bears a relationship to the embodiment of FIGS. 17A–17B which is similar to that between the embodiments of previously described FIGS. 8 and 6.

Eighth embodiment:

Referring to FIGS. 18A and 18B there are shown respective side and top diagrammatic views of yet another embodiment of the invention. The embodiment of FIGS. 18A and 18B is generally similar to that of FIGS. 17A and 17B, respectively, except that, in the embodiment of FIGS. 18A–18B, the reflector portions 818a and 818b have no curvature in the horizontal scanning plane. Instead, these reflector portions are provided with straight line profiles, but are made to approximate the presence of such curvature by providing them with an inclination, or angulation with respect to median longitudinal plane 25. Stated differently, reflector portions 818a and 818b are disposed secantially or tangentially with respect to arc 823 in a way that enables them to serve as piecewise linear approximations of a curvilinear reflector surface that parallels arc 823.

Referring to fragmentary FIG. 18C, there is shown an embodiment of the invention which is similar to that of FIGS. 18A–18B, except for the use of angulated reflector portions which have a reversed inclination with respect to median longitudinal plane 25. Thus, the embodiment of FIG. 18C bears the same relationship to the embodiment of FIGS. 18A–18B as does the embodiment of FIG. 17C to the embodiment of FIGS. 17A–17B.

Ninth embodiment:

Referring to FIG. 19, there is shown an oblique diagrammatic view of an embodiment of the invention which comprises a hybrid of the embodiments of FIGS. 6 and 17. More particularly, the embodiment of FIG. 19 includes a reflector 918 which (like the embodiment of FIG. 6) has a single piece reflective surface that extends approximately across the full width of the housing, and yet which (like the embodiment of FIGS. 17A–17B) has more reflective surface area at its end regions that at its central region. This is because receive path gap 944 occupies only the central region of reflector 918 and thereby reduces the reflective surface area of only that region. Since gap 944 does not extend into the end regions of reflector 918, it does not reduce the reflective area of those end regions. The net result is that more illumination is provided to the off axis portions of the sensing region than to the center thereof.

The above-described increase in off axis illumination may be further accentuated by using a non-linear distribution of the LEDs along the focal line of the reflector 918. More particularly, more LEDs per unit length may be positioned adjacent to the end portions of reflector 918 than are positioned adjacent to the central portion thereof as shown in FIG. 19. In the extreme case, the central region of reflector 918 may be devoid of any LEDs. It will be understood that the last mentioned case results in an LED distribution of the type shown in the embodiments of FIGS. 17 and 18.

In all of the above-discussed embodiments data read from the sensing region can be affected by what may be described as source image effects. With the LEDs positioned in a focal line of the reflective surface, a partial or complete image of the source may be projected onto the sensing region, causing variations in the intensity of the light received from the sensing region which are not related to the data encoded in the sensing region. To the end that the latter effects may be reduced, the present invention contemplates the provision of diffusing means for eliminating from light illuminating the sensing region, image information depicting the LEDs.

In one embodiment, this diffusing means takes the form of a roughening or texturing of the reflective surface which is large enough to reduce the source image content of the light reflected from the reflector, but not large enough to significantly reduce the total amount of light reflected therefrom. Examples of reflectors which have such textured surfaces are shown in FIGS. 20a and 20b.

In another embodiment, this diffusing means may take the form of a diffuser plate which is positioned between the LEDs and the associated reflectors. One diffuser plate that is particularly well suited for use with the apparatus of the invention is that sold under the trade designation "10° light shaping diffuser" by Physical Optics Corp. of Torrance, Calif. Because the use of diffuser plates in general is well known, that use will not be described in further detail herein. For purposes of clarity, such diffuser plates have been omitted from the drawings.

While the apparatus of the invention has been described with reference to a number of specific embodiments, it will be understood that the time spirit and scope of the invention should be determined with reference to the appended claims.

We claim:

1. An apparatus for illuminating a sensing region located in an object plane, comprising:

a housing having a median longitudinal plane and a scanning axis disposed in a scanning plane;

a reflector mounted within said housing for reflecting light directed thereagainst toward the sensing region, said reflector having a first curvilinear profile in a plane parallel to said scanning plane and a second curvilinear profile in a plane parallel to said median longitudinal plane, said reflector being elongated generally along said scanning axis and having a central portion, two end portions, and a focal line connecting a plurality of focal points, the central portion of said reflector defining an opening for the passage of light from said sensing region through said reflector; and a plurality of sources of substantially Lambertian illumination disposed in said focal line for directing light against the reflector.

2. The apparatus of claim 1 further including a photodetector, and focusing means for focusing light from said sensing region onto said photodetector.

3. The apparatus of claim 2 in which said photodetector is offset to one side of said scanning plane, and in which the apparatus further includes a auxiliary reflector for reflecting light incident on the focusing means toward said photodetector.

4. The apparatus of claim 3 in which said photodetector is located between the focusing means and the sensing region, whereby the optical path between the sensing region and the photodetector is folded back on itself.

5. The apparatus of claim 2 in which light from said sensing region must pass through said opening before being focused onto said photodetector.

6. The apparatus of claim 1 in which said focusing means, said opening and said sensing region lie approximately in said scanning plane.

7. The apparatus of claim 1 in which said reflector has a single piece structure and in which said opening occupies only the central portion of said reflector.

8. The apparatus of claim 1 in which more sources of illumination are located adjacent to the end portions of said reflector than are located adjacent to the central portion of said reflector.

9. The apparatus of claim 8 in which said sources of illumination are located only adjacent to the end portions of said reflector.

10. The apparatus of claim 1 further including light diffusing means disposed in the optical path between said sources and the sensing region for substantially removing from light illuminating the sensing region image information depicting said sources.

11. The apparatus of claim 10 in which said diffusing means comprises a diffusing member positioned between the reflector and the sensing region.

12. The apparatus of claim 10 in which said diffusing means comprises a textured surface formed in said reflector.

13. An apparatus as set forth in claim 1 further including a circuit board within said housing for supporting said sources of illumination in said focal line.

14. An apparatus as set forth in claim 13 in which the illumination axes of said sources of illumination are aligned approximately perpendicular to the plane of said circuit board.

15. An apparatus as set forth in claim 13 in which at least one edge of said reflector is attached to said circuit board.

16. An apparatus as set forth in claim 14 in which at least one edge of said reflector is attached to said circuit board.

17. An apparatus for illuminating a sensing region located in an object plane, comprising:

a housing having a median longitudinal plane and a scanning axis disposed in a scanning plane;

a reflector mounted within said housing for reflecting light directed thereagainst toward the sensing region, said reflector having a first reflective surface made up of a plurality of first linear component reflective surfaces which together have a profile that approximates a first curvilinear profile in a plane parallel to said scanning plane and a second reflective surface made up of a plurality of second linear component reflective surfaces which together have a profile that approximates a second curvilinear profile in a plane parallel to said median longitudinal plane, said reflector being elongated generally along said scanning axis and having a central portion, two end portions, and a focal line connecting a plurality of focal points, the central portion of said reflector defining an opening for the passage of light from said sensing region through said reflector; and a plurality of sources of substantially Lambertian illumination disposed in said focal line for directing light against the reflector.

18. An apparatus for illuminating a sensing region located in an object plane, comprising:

a housing having a median longitudinal plane and a scanning axis disposed in a scanning plane;

a plurality of discrete reflectors mounted within said housing for reflecting light directed thereagainst toward the sensing region, each of said reflectors having a first reflective surface made up of a plurality of first linear component reflective surfaces which together have a profile that approximates a first curvilinear profile in a plane parallel to said scanning plane and a second reflective surface made up of a plurality of second linear component reflective surfaces which together have a profile that approximates a second curvilinear profile in a plane parallel to said median longitudinal plane, said reflectors each having reflective surfaces which extend generally along said scanning axis and define respective focal lines connecting respective pluralities of focal points, said reflectors together defining a gap for the passage of light from said sensing region between said reflectors; and a plurality of sources of substantially Lambertian illumination disposed in the focal lines of each of said reflectors for directing light against the respective reflectors.

19. The apparatus of claim 18 in which said first linear component reflective surfaces are disposed secantially with respect to respective portions of a curve lying in said scanning plane.

20. An apparatus for illuminating a sensing region located in an object plane, comprising:

a housing having a median longitudinal plane and a scanning axis disposed in a scanning plane;

a plurality of discrete reflectors mounted within said housing for reflecting light directed thereagainst toward the sensing region, each of said reflectors having a first curvilinear profile in a plane parallel to said scanning plane and a second curvilinear profile in a plane parallel to said median longitudinal plane, said reflectors each having reflective surfaces which extend generally along said scanning axis and define respective focal lines connecting respective pluralities of focal points, said reflectors together defining a gap for the passage of light from said sensing region between said reflectors;

a photodetector for receiving light from said sensing region, through said gap, and converting said light into an electrical signal; and a plurality of sources of substantially Lambertian illumination disposed in the focal lines of each of said reflectors for directing light against the respective reflectors;

wherein the path along which light travels from said sensing region to said detector lies in approximately the same plane as the path along which light travels from said reflectors to said sensing region.

21. The apparatus of claim 20 in which said reflectors are disposed substantially symmetrically with respect to said median longitudinal plane.

22. The apparatus of claim 20 in which said gap extends generally along said scanning axis and includes no reflective surface.

23. The apparatus of claim 20 further including a photodetector, and focusing means for focusing light from said sensing region onto said photodetector.

24. The apparatus of claim 23 in which said photodetector is offset to one side of said scanning plane, and in which the apparatus further includes an auxiliary reflector for reflecting light incident on the focusing means toward said photodetector.

25. The apparatus of claim 24 in which said photodetector is located between the focusing means and the sensing region, whereby the optical path between the sensing region and the photodetector is folded back on itself.

26. The apparatus of claim 23 in which light from said sensing region must pass through said opening before being focused onto said photodetector.

27. The apparatus of claim 20 in which the first profiles of said reflectors define curves that lie along respective portions of a curve lying in said scanning plane.

28. The apparatus of claim 20 further including light diffusing means disposed in the optical path between said sources and the sensing region for substantially removing from light illuminating the sensing region image information depicting said sources.

29. The apparatus of claim 28 in which said diffusing means comprises a diffusing member positioned between the reflector and the sensing region.

30. An apparatus as set forth in claim 20 further including a circuit board within said housing for supporting said sources of illumination in said focal lines.

31. An apparatus as set forth in claim 30 in which the illumination axes of said sources of illumination are aligned approximately perpendicular to the plane of said circuit board.

32. An apparatus as set forth in claim 30 in at least one of the edges of said reflectors is attached to said circuit board.

33. An apparatus as set forth in claim 31 in at least one of the edges of said reflectors is attached to said circuit board.

* * * * *